(12) United States Patent
Snyder

(10) Patent No.: US 7,233,963 B2
(45) Date of Patent: Jun. 19, 2007

(54) SYSTEMS AND METHODS FOR DIFFUSING CLIPPING ERROR

(75) Inventor: John Michael Snyder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 10/103,220

(22) Filed: Mar. 20, 2002

(65) Prior Publication Data

US 2003/0182341 A1   Sep. 25, 2003

(51) Int. Cl.
  *G06F 15/00* (2006.01)
(52) U.S. Cl. ..................................... 708/200
(58) Field of Classification Search ............... 708/550, 708/200–209; 358/3.03, 1.9
  See application file for complete search history.

(56) References Cited

U.S. PATENT DOCUMENTS

| | | | | |
|---|---|---|---|---|
| 5,051,841 | A * | 9/1991 | Bowers et al. | 358/3.04 |
| 5,111,484 | A * | 5/1992 | Karabinis | 375/340 |
| 5,373,455 | A * | 12/1994 | Edgar | 382/252 |
| 5,553,171 | A * | 9/1996 | Lin et al. | 358/445 |
| 5,907,500 | A * | 5/1999 | Nadehara | 708/700 |
| 5,931,690 | A * | 8/1999 | Sai et al. | 439/350 |
| 5,963,714 | A * | 10/1999 | Bhattacharjya et al. | 358/3.03 |
| 5,974,228 | A * | 10/1999 | Heitsch | 358/1.9 |
| 6,529,150 | B1* | 3/2003 | Shoop et al. | 341/137 |
| 6,671,071 | B1* | 12/2003 | Kletter | 358/3.03 |
| 6,718,357 | B2* | 4/2004 | Ha | 708/552 |
| 6,757,079 | B1* | 6/2004 | Chen | 358/3.03 |

FOREIGN PATENT DOCUMENTS

JP   62-3516   *  1/1987

OTHER PUBLICATIONS

Al-Dhahir, N. et al., "On the Uniform ADC Bit Precision and Clip Level Computation for a Gaussian Signal," *IEEE Trans. on Signal Proc.*, 1996, 44(2), 434-438.
Calvagno, G. et al., "Synthesis Filter Bank Optimization in Two-Dimensional Separable Subband Coding Systems," *IEE Trans. on Image Proc.*, 2000, 9(9), 1497-1508.
Chen, C-T et al., "Design and VLSI Implementation of Real-Time Weighted Median Filters," *Proceedings of APCCAS'94—1994 Asia Pacific Conference on Circuits and Systems*, Dec. 5-8, 1994, 94-96.
Damera-Venkata, N. et al., "Adaptive Threshold Modulation for Error Diffusion Halftoning," *IEEE Trans. on Imaging Proc.*, 2001, 10(1), 104-116.

(Continued)

Primary Examiner—Meng-Al T. An
Assistant Examiner—Chat C. Do
(74) Attorney, Agent, or Firm—Woodcock Washburn LLP

(57) ABSTRACT

Systems and methods are provided for diffusing clipping error in a computing system. When a data set contains values which are to be restricted to a range, and the data set includes one or more values which are beyond the range, the invention provides methodology that is an improvement over clipping extraneous values to the range or squeezing the values to the range. Advantageously, systems and methods are provided for distributing or diffusing error to neighboring samples of the data set, thereby spreading localized error, and minimizing the effects associated with remapping the data set to the restrictive range.

28 Claims, 8 Drawing Sheets

OTHER PUBLICATIONS

Doughert, E.R., "Optimal Conjuctive Granulometric Bandpass Filters," *J. Math. Imaging and Vision*, 2001, 14(1), 39-51.

Malvar, H.S. et al., "Optimal FIR pre-and postfilters for decimation and interpolation of random signals," *IEEE Trans. on Communications*, 1988, 36(1), 67-74.

Medina, J. et al., "A Cliping-Off Interior-Point Technique for Medium-Term Hydro-Thermal Coordination," *IEEE Trans. on Power Systems*, 1999, 14(1), 266-273.

Pratt, W.K. et al., "Pseudomedian Filter," *Architectures and Algorithms for Digital Image Processing II: Proceedings of SPIE—The International Society for Optical Engineering*, Los Angeles, CA, Jan. 24-25, 1985, 34-43.

Schietse, J. et al., "Training Binary Perceptrons by Clipping," *Europhysics Letters*, 1995, 32(3), 279-284.

Victor, T., "Adaptive Filter Technique for Digital Image Enhancement," *Digital Image Processing: Proceedings of SPIE—The International Society for Optical Engineering*, Los Angeles, CA, Jan. 22-23, 1985, 29-42.

Floyd, R.W. et al., "An Adaptive Algorithm for Spatial Grey Scale," *SID Digest*, 1975, 36-37.

Meyer-Gruhl, U. et al., "Improvements for Color Dithering," *Proceedings of the IS&T/SID Third Color Imaging Conference: Color Science, Systems, and Applications*, 1995, 4 pages.

Puzicha, J. et al., "Model-based Halftoning for Color Image Segmentation,"*ICPR'00*, Barcelona, Spain, Sep. 2000, 4 pages.

\* cited by examiner

FIG. 1A - Prior Art
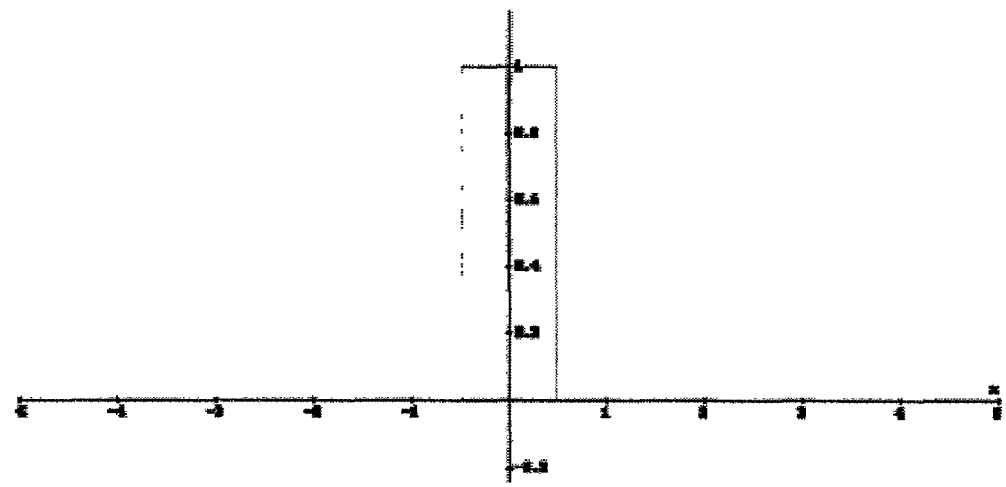
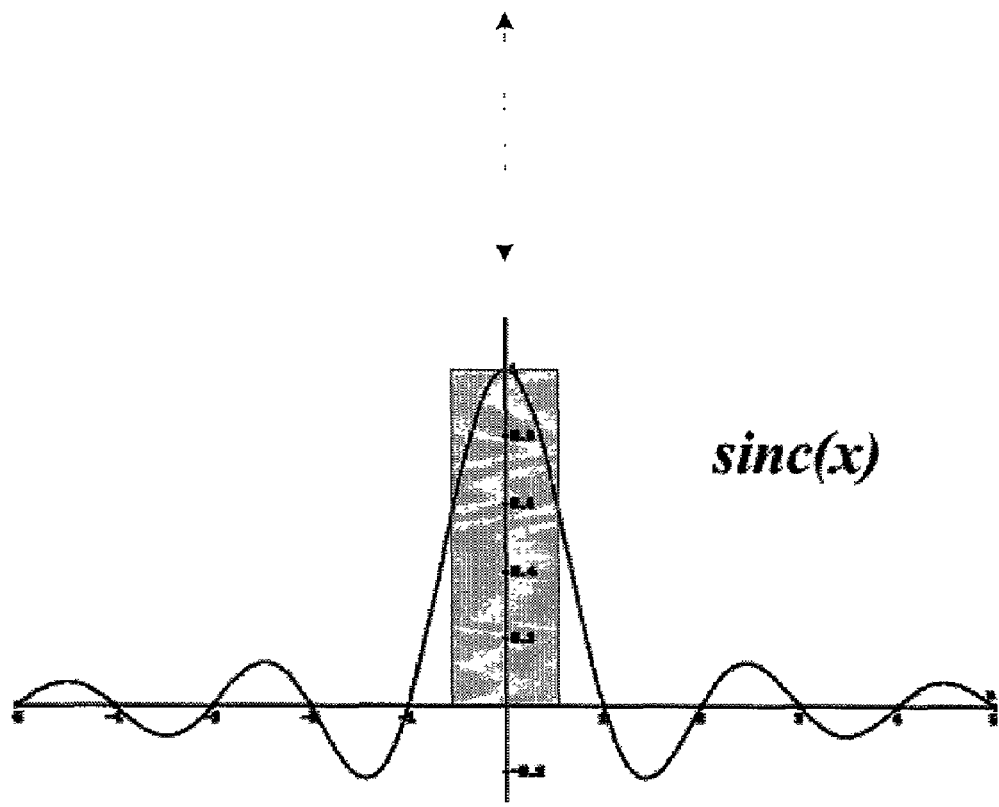
sinc(x)
FIG. 1B - Prior Art

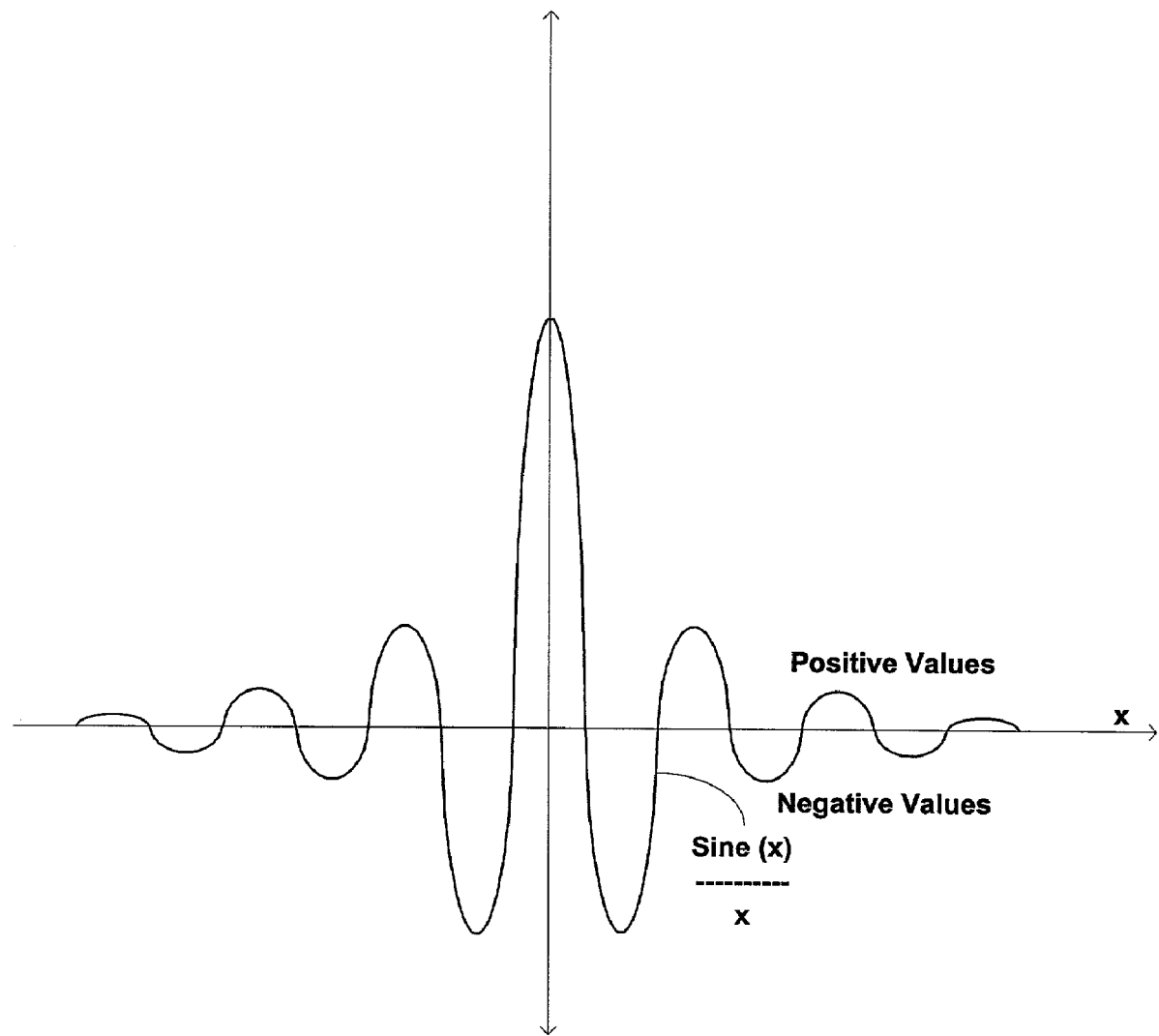
FIG. 1C - Prior Art

SYSTEMS AND METHODS FOR DIFFUSING CLIPPING ERROR

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2001, Microsoft Corp.

FIELD OF THE INVENTION

The present invention relates to systems and methods for minimizing error in a computing system. More particularly, the present invention relates to systems and methods for diffusing error produced as a result of clipping to a range in a computing system.

BACKGROUND OF THE INVENTION

Aliasing is a type of error that results from sampling, and/or from performing other approximations with respect to an original signal, such as a graphics image, audio signal, texture map data, perspective transformation data, and the like. In sound and image generation, aliasing is the generation of a false, or alias, frequency component along with the correct frequency components when performing frequency sampling. For images, aliasing produces a jagged edge, or stair-step effect. For audio, aliasing produces a buzz or noisy effect. If one has ever watched a movie and seen the wheel of a rolling wagon or car appear to be going backwards, one has witnessed aliasing. In such a case, the movie's frame rate is not adequate to describe the rotational frequency of the wheel, and our eyes are deceived by the misinformation as a result.

The Nyquist theorem states that frequency components can be successfully rendered without aliasing as long as the components do not exceed one-half the sampling frequency. Aliasing occurs for any components that exceed one-half the sampling rate.

As mentioned, aliasing can occur with respect to any sampled signal, such as an audio signal. For example, suppose an audio sine wave tone with steadily increasing frequency, from a low base tone to a high treble tone, is sampled at 48 KHz. At lower frequencies, the tone is sampled with many points per cycle. As the tone rises in frequency, though, the cycles are shorter and fewer and fewer points are available to describe it. At a frequency of 24 KHz, only two sample points are available per cycle, and the Nyquist limit has been reached. Still, in a lossless theoretical world, those two points are adequate to recreate the 24 KHz tone after conversion back to analog and low-pass filtering.

However, as the tone continues to rise above 24 KHz, the number of samples per cycle is not adequate to describe the waveform, and the inadequate description is equivalent to, or wraps to, a lower frequency tone, which creates aliasing artifacts in the reconstruction. In this regard, the tone seems to reflect around the 24 KHz point, i.e., a 25 KHz tone becomes indistinguishable from a 23 KHz tone, a 30 KHz tone becomes indistinguishable from an 18 KHz tone, etc.

In music, with its many frequencies and harmonics, aliased components mix with the real frequencies to yield a particularly obnoxious form of distortion and to generate cacophonic effects. With video, the edges of objects, and other portions of the image with high frequency content, are misrepresented, harming the quality of the picture. Thus, where the generation of an artifact free signal is desired, steps are taken from the beginning to ensure minimization of such aliasing. While area sampling has been proposed, in practice, it is hard to apply. In image processing, one sample per pixel is insufficient to avoid aliasing because there is no guarantee that the one sample sufficiently reflects all of the detail represented by the pixel space. This is so because even within the area represented by one pixel, there may be a lot of variation, particularly along the edge of some object, and so one sample is not enough for each pixel. For instance, if the center of a pixel falls right on the edge of a black box on a white background, such that half of the pixel in theory should be black and half of the pixel should be white, taking a white sample as being representative insufficiently represents the presence of the black object, and taking a black sample as being representative insufficiently represents the presence of the white background.

By taking more samples than there are pixels, the effects of aliasing can be reduced. In the above case of the black box edge on the white background and applicable two by two oversampling, if two black samples and two white samples are taken as a result, and then averaged to form one pixel value, the resulting gray pixel will better represent the image content, avoiding aliasing. Thus, oversampling and averaging is one way to minimize aliasing, or antialias the image. The same techniques work for other signals, such as audio signals. Antialiasing is the smoothing of the image or sound roughness caused by aliasing.

Since an infinite number of samples cannot be taken through oversampling, typically, the resulting frequency content of a sampled signal still contains some amount of energy above the Nyquist frequency, and thus some aliasing effects can remain even after oversampling. With sound and image data, aliases are removed by eliminating frequencies above the Nyquist frequency, or half the sampling frequency. With images, other approaches include adjusting pixel positions or setting pixel intensities so that there is a more gradual transition between the color of a line and the background color.

One way of attempting to antialias is to utilize a positive bump filter; however, bump filters introduce artifacts to the reconstructed signal. For example, utilizing a bump filter with image data can cause a blurriness or aliasing like effects. An ideal filter for removing frequencies above the Nyquist frequency is a box filter in the frequency domain (See FIG. 1A) set at the Nyquist frequency. This corresponds to a sinc filter (sin (x)/x) in the spatial domain (See FIGS. 1B and 1C). The sinc function is infinite which means that it is impossible to have a perfect reconstruction filter in the spatial domain; however, adequate approximations that discard very small values for very high x values and very low x values are useful since convolution with respect to those values makes a de minimis contribution to the end result.

However, a problem arises in connection with convolving the sinc function with a real valued signal limited to a range, which is the case for image data because pixel representations are generally limited to the range [0, 255], or [0, 65535]. The problem that arises is that the values resulting from the convolution for any given sample may be outside of the range. For instance, where pixel representation is limited to the range [0, 255], a value may result that is negative, or larger than 255.

One way of handling the resulting values that are outside of the range is to clip the values to the limits of the range. For example, for the range [0, 255], −10, −3, and −1175 would each be represented by 0 and 258, 293 and 1034 would each be represented by 255. However, this method results in artifacts being present in the reconstructed signal as well, and effectively reintroduces aliasing into the signal.

Another technique for handling this scenario is to remap the resulting range onto the original range, i.e., if the resulting range as a result of convolution with the sinc function is [−128, 383], this range could be remapped to [0, 255] by adding 128 to the value and dividing by two. In this fashion, each pixel value would again be in the range [0, 255] as a result of this range "squeezing" process. However, this technique introduces problems in the reconstructed data as well. In particular, this technique tends to have the effect of reducing contrast in the data.

Thus, an improved technique is desired for reconstructing a quality signal from point samples that avoids the persisting aliasing problems and various introductions of other artifacts in accordance with prior art techniques. Furthermore, an improved technique is desired for remapping values outside of a range back to the range, i.e., for minimizing clipping error. Still further, a method is desired which generally diffuses the error created from such a remapping process in order to minimize local error in the reconstructed signal.

SUMMARY OF THE INVENTION

In view of the foregoing, the present invention provides systems and methods for diffusing clipping error in a computing system. When a data set contains values which are to be restricted to a range, and the data set includes one or more values which are beyond the range, the invention provides methodology that is an improvement over clipping extraneous values to the range or squeezing the values to the range. Advantageously, the invention provides systems and methods for distributing or diffusing error to neighboring samples of the data set, thereby spreading localized error, and minimizing the effects associated with remapping the data set to the restrictive range.

Other features and embodiments of the present invention are described below.

BRIEF DESCRIPTION OF THE DRAWINGS

The system and methods for diffusing clipping error are further described with reference to the accompanying drawings in which:

FIGS. 1A through 1C illustrate exemplary sinc functions in accordance with a non-limiting signal processing operation that produces clipping error diffused by the present invention;

DETAILED DESCRIPTION OF THE INVENTION

Overview

The present invention provides improved techniques for reconstructing a signal from point samples. More particularly, the invention relates to diffusing clipping error produced from clipping values outside of a given range. In one embodiment, the invention is applied to an image reconstruction process. In such a case, clipping error may arise through the convolution of a sinc filter with the signal data in order to eliminate aliasing effects that occur in the absence of the convolution. Rather than clip to the limits of the range, or squeeze the range, the invention diffuses the clipping error to neighboring samples, thereby minimizing local error, and more evenly spreading the error across the image.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may perform signal sampling and processing techniques in accordance with the invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may request the improved signal processing of the present invention.

Figure 2A:
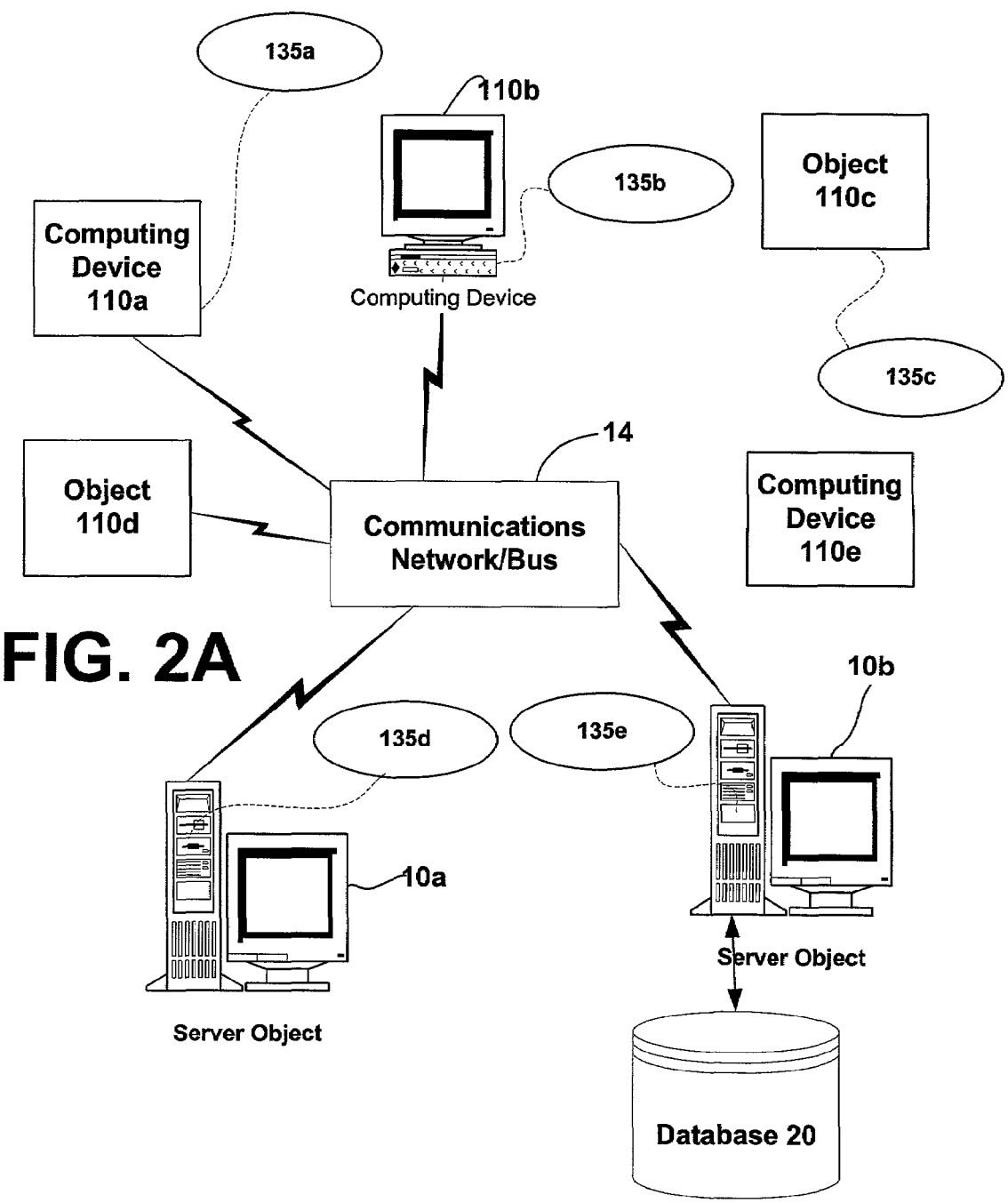
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2A. In accordance with an aspect of the invention, each object 10 or 110 may contain an application that might request signal processing resources of a host system.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. The improved signal processing in accordance with the present invention may thus be distributed among clients and servers, acting to process signal(s) in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since signal data, such as graphics data, may in practice be physically located in one or more locations, the ability to process the signal data across computing devices is of great utility in such a system.

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.12B) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to the signal processing of the invention.

The Internet commonly refers to the collection of networks and gateways that utilize the TCP/IP suite of protocols, which are well-known in the art of computer networking. TCP/IP is an acronym for "Transport Control Protocol/ Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to sample and reconstruct signal data in an improved manner.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing signal data. Thus, the present invention can be utilized in a computer network environment having client computers 110a, 110b, etc. that can access and interact with a computer network/bus 14 and server computers 110a, 11b, etc. that may interact with client computers 110a, 110b, etc. and other devices 111 and databases 20.

Exemplary Computing Device

Figure 2B:
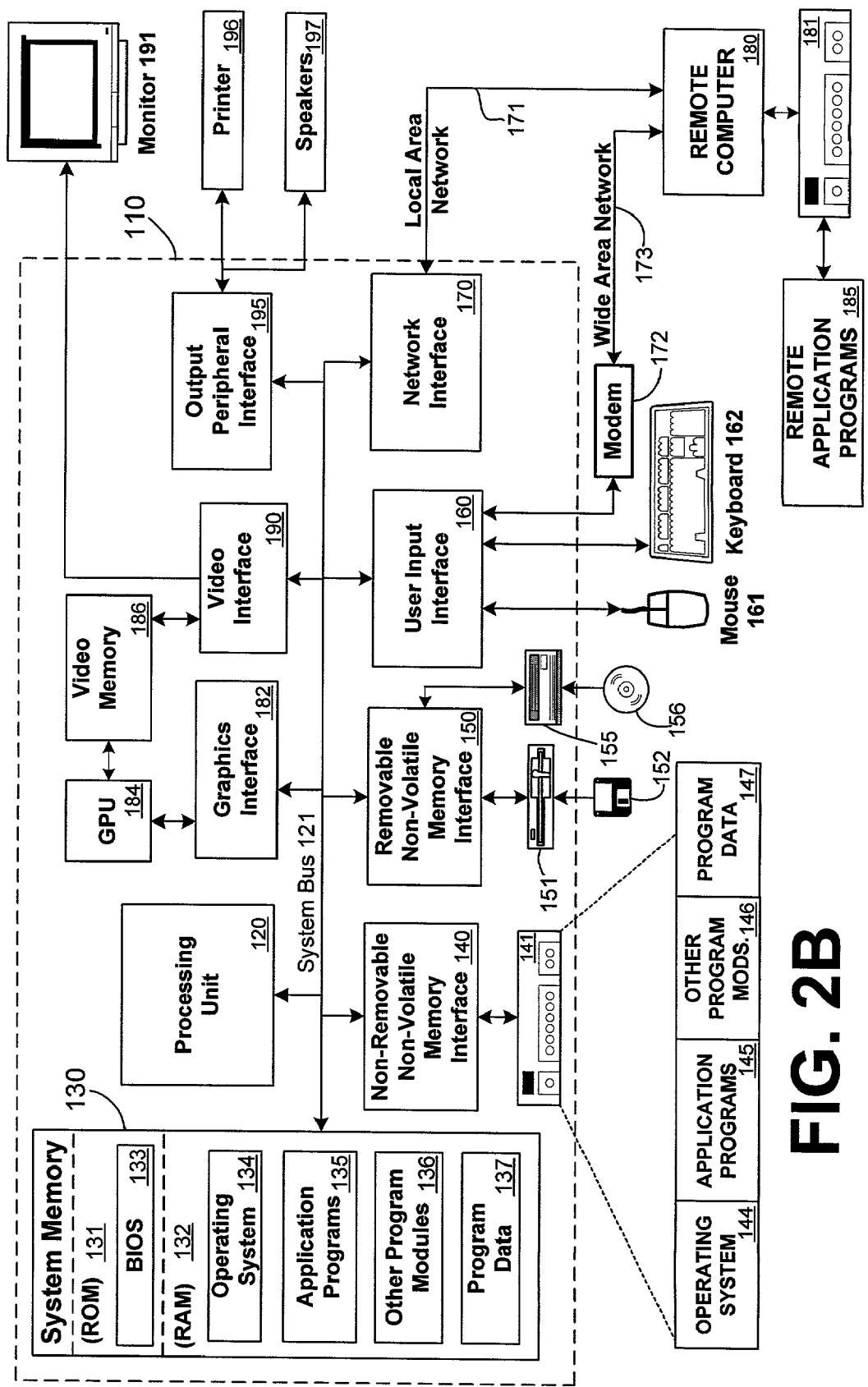
FIG. 2B is a block diagram representing an exemplary non-limiting computing device in which the present invention may be implemented.

FIG. 2B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the improved processing of sample data in accordance with the invention.

Although not required, the invention can be implemented via an operating system, for use by a developer of services for a device or object, and/or included within application software that aids in or performs signal processing and/or reconstruction in a computing system. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .Net platform includes servers, building-block services, such as Web-based data storage and downloadable device software. Generally speaking, the .Net platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that signal processing services may be performed by, supported in or accessed via all of .NET's languages and services, and in other distributed computing frameworks as well.

Error Diffusion

Thus, the invention may be applied in a variety of networked environments, in a variety of computing devices, and in a variety of forms whether software and/or hardware therein. The invention also applies to any kind of signal with data samples outside of a range in connection with which the processing of the data samples should be within the range. Prior art techniques clip the "out of bounds" data to the range, or squeeze the data across all of the data to fit the range. As noted, each of these techniques has problems associated therewith. The present invention advantageously diffuses the error to nearby portions of the signal. While the technique may artificially produce error where none existed, the reduction of the magnitude of local error significantly improves overall quality. In one embodiment, the techniques for diffusing error are conducted in an "order blind" fashion such that the techniques are indifferent as to which portion of the signal on which the techniques begin to operate.

Figure 3A:
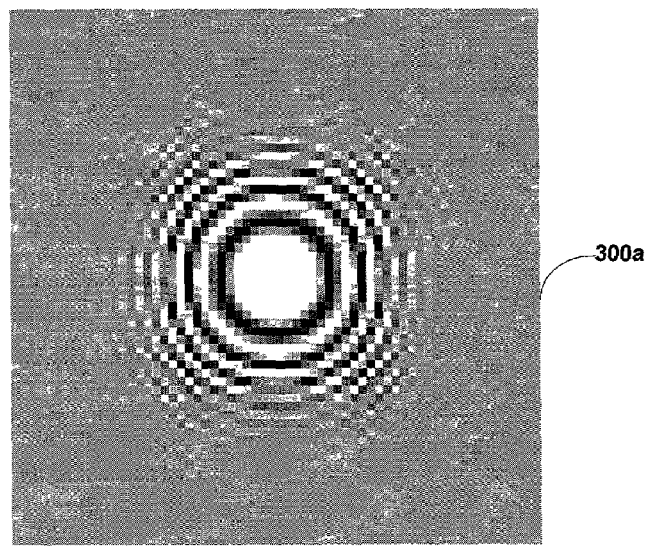
FIGS. 3A through 3C illustrate exemplary operation of the error diffusion of the invention in connection with image reconstruction from point samples.
Figure 3B:
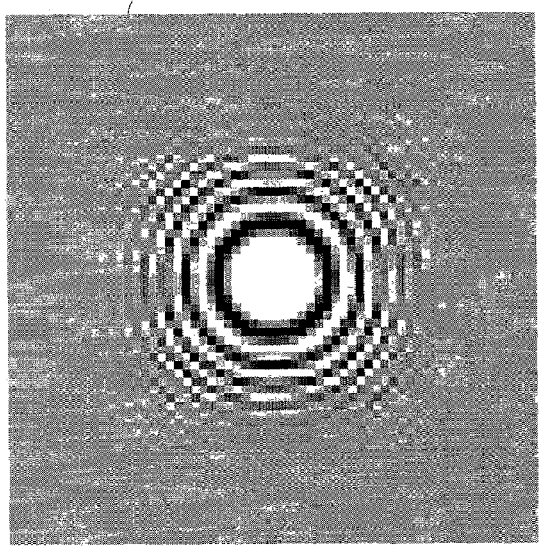
Figure 3C:
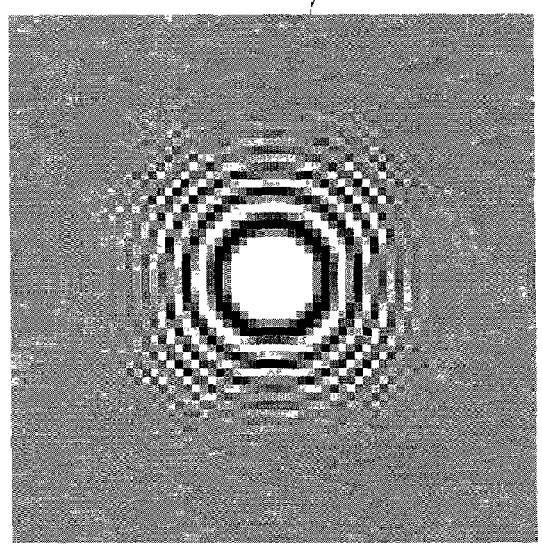

Thus, in the context of point sampling an image, after averaging point samples for each bin or pixel value, an image results that typically contains some energy above the Nyquist frequency, and accordingly some aliasing effects. As a result, the image is convolved with a negative lobed filter, such as the sinc filter illustrated in FIGS. 1A to 1C, in both the x and y directions to produce resultant image data; however, since some of values for the data may be outside of the range [0, 255], a range typically utilized to represent image data, a remapping to the range [0, 255] must be performed to represent the data as an image. FIG. 3A illustrates an image 300a, which performs such remapping by merely clipping the extraneous values in accordance with the prior art. FIG. 3B illustrates the technique of the invention whereby the clipping error is diffused to neighboring pixel values of image data 300b according to one iteration of the invention, prior to clipping, if any is still required. FIG. 3C illustrates the techniques of the invention whereby the clipping error is diffused to neighboring pixel values of image data 300c according to sixteen iterations, prior to clipping, if any is still required. Practically speaking, one iteration of the invention is sufficient for producing advantageous effects. Subsequent iterations, while they may be marginally beneficial, may not be worth the concomitant increase in computation.

Figure 4A:
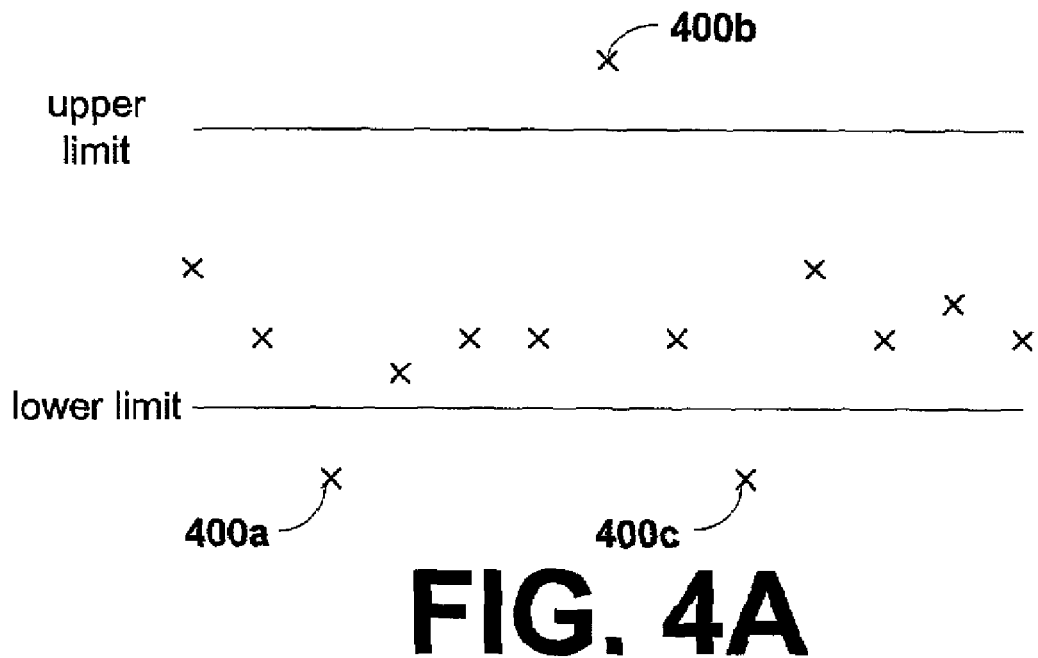
FIGS. 4A through 4E illustrate non-limiting exemplary operation of the error diffusion techniques of the invention in the context of one-dimensional data.
Figure 4B:
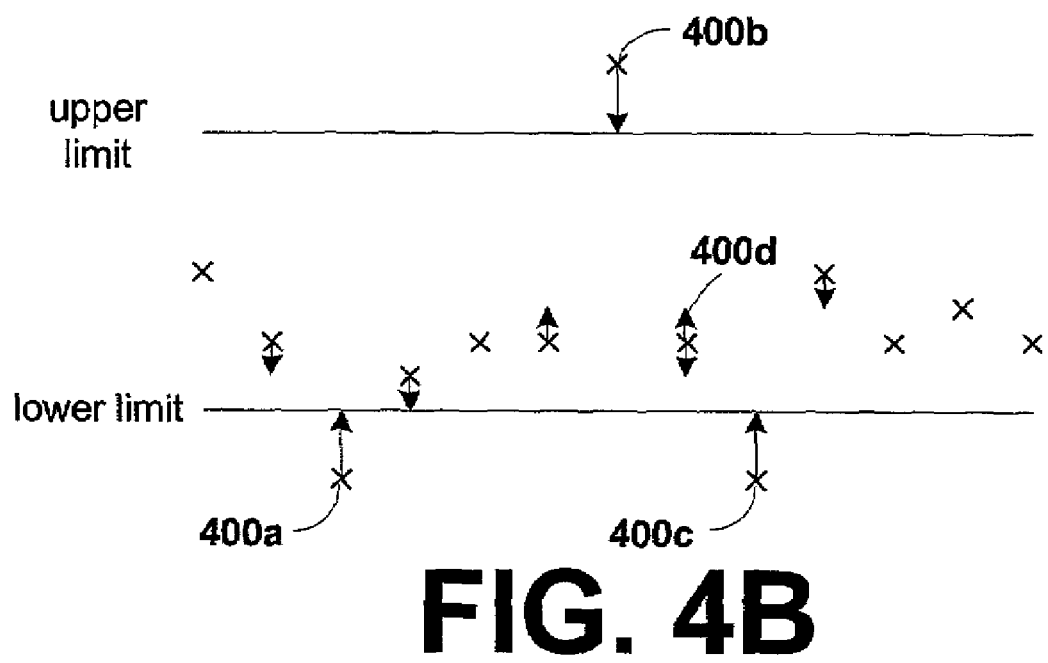
Figure 4C:
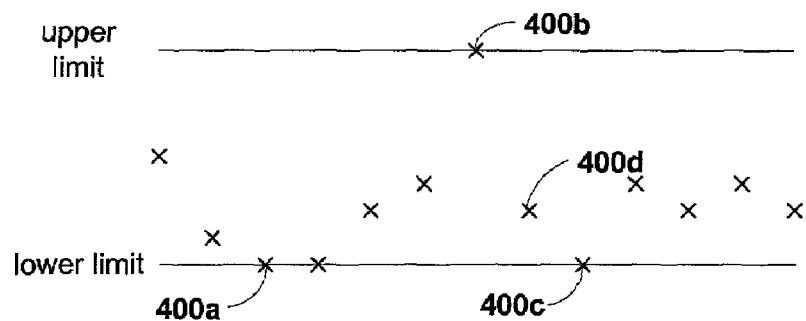
Figure 4D:
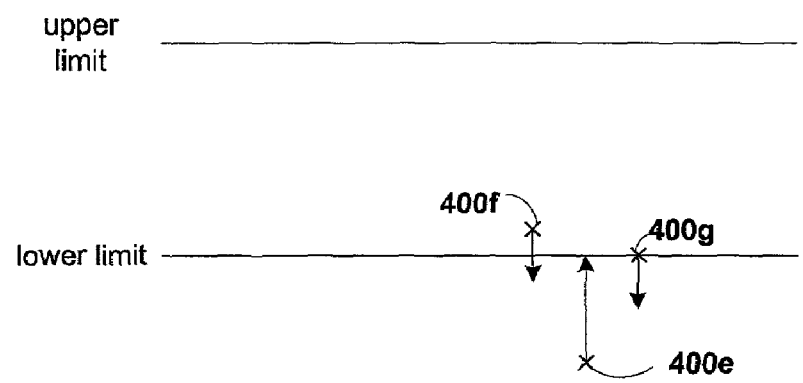
Figure 4E:
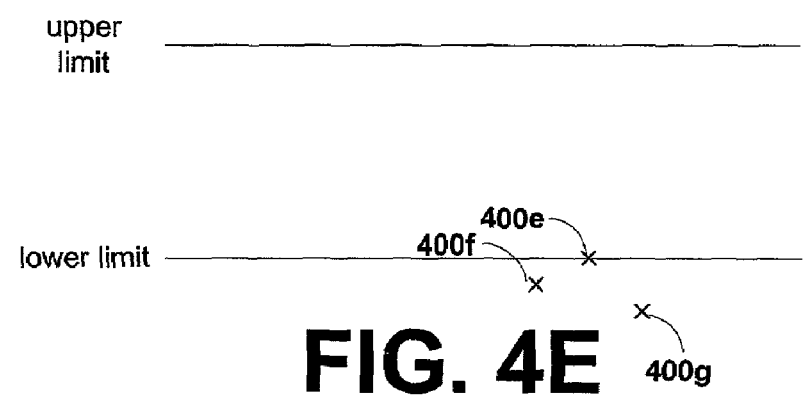

FIGS. 4A through 4E illustrate exemplary processing according to the error diffusion of the invention. FIG. 4A illustrates data that contains values 400a, 400b and 400c that are beyond the lower and upper limits of the range with which the data is to represented. Instead of clipping the values 400a, 400b and 400c to the lower limit, the upper limit and the lower limit, respectively, the invention diffuses the error to the neighbors of the pixel. In one dimension (1-D), this extends to the left and right neighbors as illustrated. In two or more dimensions, this extends to the neighbors for each dimension. FIG. 4B thus illustrates the operation of the invention whereby the error is distributed in equal fractions to the neighbors, producing the result of FIG. 4C. The techniques of the invention may be applied in an order blind fashion, i.e., when applied in an order blind fashion, it does not matter which order the pixels are operated upon, ensuring that the resulting distribution of error is the same. It is further noted, as with the case of sample 400d, that when a sample is adjusted in both, or multiple, directions, the net adjustment is the vector sum of adjustments. For example, sample 400d is adjusted in both directions equally and so its value remains unchanged.

Notwithstanding the distribution of error, there may be some negative values that remain. For example, after distributing the error of sample 400e of FIG. 4D to its neighbors, the neighbors 400f and 400g become negative. In such a case, the error distribution procedure has brought some samples outside of the range that would not otherwise be outside of the range. In such a case, further iterations of error distribution according to the invention may be applied, or alternate prior art approaches may supplement the technique. For example, samples 400f and 400g may simply be clipped to the lower limit of the range after one or more iterations of the invention. In such a way, the absolute value of movement by any one sample is lower than if sample 400e had been clipped without any iterations. Also, the squeezing technique may be applied to the data after one or more iterations of the invention. If the squeezing technique is applied after one iteration of the invention, for example, then one can see from FIGS. 4D and 4E that sample 400g is closer to the lower limit than the originally placed 400e, and accordingly the amount of squeezing would be reduced in such a case. Thus, the invention may be used to improve upon the clipping and squeezing error introduced by prior art techniques.

Also, while the above examples refer to and one and two dimensional data sets, the invention is not limited to one or two dimensional data sets. The invention may apply to 3D and other multi dimensional arrays of data. The invention may apply to image data, audio data, or to any data set for which it is desirable to clip data to a range.

As discussed in the background, one problem with image data is the various introduction of aliasing effects when reconstructing an image from point samples. Thus, one application contemplated for the invention is in connection with filtering image data to reduce the effects of aliasing. In this regard, filters with negative lobes are useful for high-quality decimation of images. Compared to positive filters, like box or Gaussian filters, negative lobe filters preserve more of an image's high frequencies without leaking aliasing. A problem with such negative-lobed filters, though, is that they can produce samples outside the allowable intensity range, even when the input samples are within that range, in which case the techniques of the invention may be applied. For example, for images with pixels in the range [0,1] such as with grayscale or rgb color values, the filtered result can have values less than 0 or greater than 1. As discussed in the background, the standard solution is clipping: simply setting negative values back to 0 and values greater than 1 back to 1. Unfortunately, this simple solution has artifacts, especially in high-frequency images.

While difficult to see the effects of the invention in FIGS. 3A to 3C due to limitations in printing technology, the present invention operates to improve the quality of the image reconstruction. For example, some applications used incident to the rendering of FIGS. 3A to 3C may use a blurry interpolation instead of exact pixel replication. Further, some printers require a different "gamma" value than the monitor to provide a linear display. The advantages of the invention are most apparent on a screen with a pixel-replicating reconstruction, and particularly when the image is animated.

Exemplary Pseudocode

One implementation, which is shown and described in connection with FIGS. 4A to 4E, distributes half the clipped error to neighbors on each side of the sample that would have been clipped. In one embodiment, to make the process independent of the order in which samples are visited, a temporary buffer is utilized that accumulates adjustments to the signal based on all samples outside the valid range. The adjustments are then added to the signal in a final pass. Such an operation is represented by the following exemplary pseudocode:

```
/*
  distribute_clipped signal: distribute energy outside of range [0,1]
  to neighboring samples.
  s is 1D signal buffer with n samples.
*/
static void distribute_clipped_signal(double *s, double *tmp, int n)
{
    int i;
    int changed = 1;
    int iters = 0;
    while (changed && iters < distribute_clip_maxiters) {
        changed = 0;
        for (i = 0; i < n + 2; i++) tmp[i] = 0;
        for (i = 0; i < n; i++) {
            if (in[i] < 0) {
                tmp[i+1] -= s[i];
                tmp[i] += s[i]*0.5;
                tmp[i+2] += s[i]*0.5;
                changed = 1;
            } else if (in[i] > 1.0) {
                tmp[i+1] -= s[i]-1;
                tmp[i] += (s[i]-1)*0.5;
                tmp[i+2] += (s[i]-1)*0.5;
                changed = 1;
            }
        }
        for (i = 0; i < n; i++) s[i] += tmp[i+1];
        iters++;
    }
}
```

As mentioned above in connection with FIGS. 4D and 4E, there is no guarantee that a single iteration puts all samples in the valid range. Thus, further iterations may be performed that diffuse the clipped error with respect to these remaining samples. With a subsequent step, the diffused results may be clipped to the valid range, or otherwise squeezed to the valid range. Generally, it has been found that one iteration of the clipped error diffusion is sufficient for producing high quality signal reproductions. As illustrated by FIGS. 3B and 3C, there is little difference between the result with 1 error diffusion iteration (FIG. 3B) and the result with 16 iterations (FIG. 3C). To make the algorithm more efficient from a computing resource standpoint, the temporary buffer can be removed from the pseudocode. Albeit non-limiting, such an optimized routine might look like the following:

```
inline double error(double s) {
    if (s < 0)
        return s;
    else if (1 < s)
        return 1 - s;
    else
        return 0;
}
/*
``` distribute_clipped_signal: distribute energy outside of range [0,1] to neighboring samples s is 1D signal buffer with n samples. It is modified in place.

```
*/
static void distribute_clipped_signal(double *s, int n)
{
    double buf[3];
    double *e = buf + 1;
    e[-1] = 0;
    e[0] = 0.5 * error(s[0]);
    for (int i = 0; i < n - 1; i++) {
        e[1] = 0.5 * error(s[i+1]);
        s[i] += e[-1] - 2*e[0] + e[1];
        e[-1] = e[0];
        e[0] = e[1];
    }
    s[n-1] += e[-1] - 2*e[0];
}
```

Such exemplary pseudocode has been designed for a one dimensional array of data. When separably filtering signals, with two (or more) dimensions, with wide kernels such as the image utilized to produce FIGS. 3A to 3C, it is more efficient to perform a two (or more) pass technique which filters horizontally and then vertically, with 1D filters. In such a case, the clipped error diffusion step may be applied after each 1D filter is applied.

Exemplary Hardware Implementation

Figure 5:
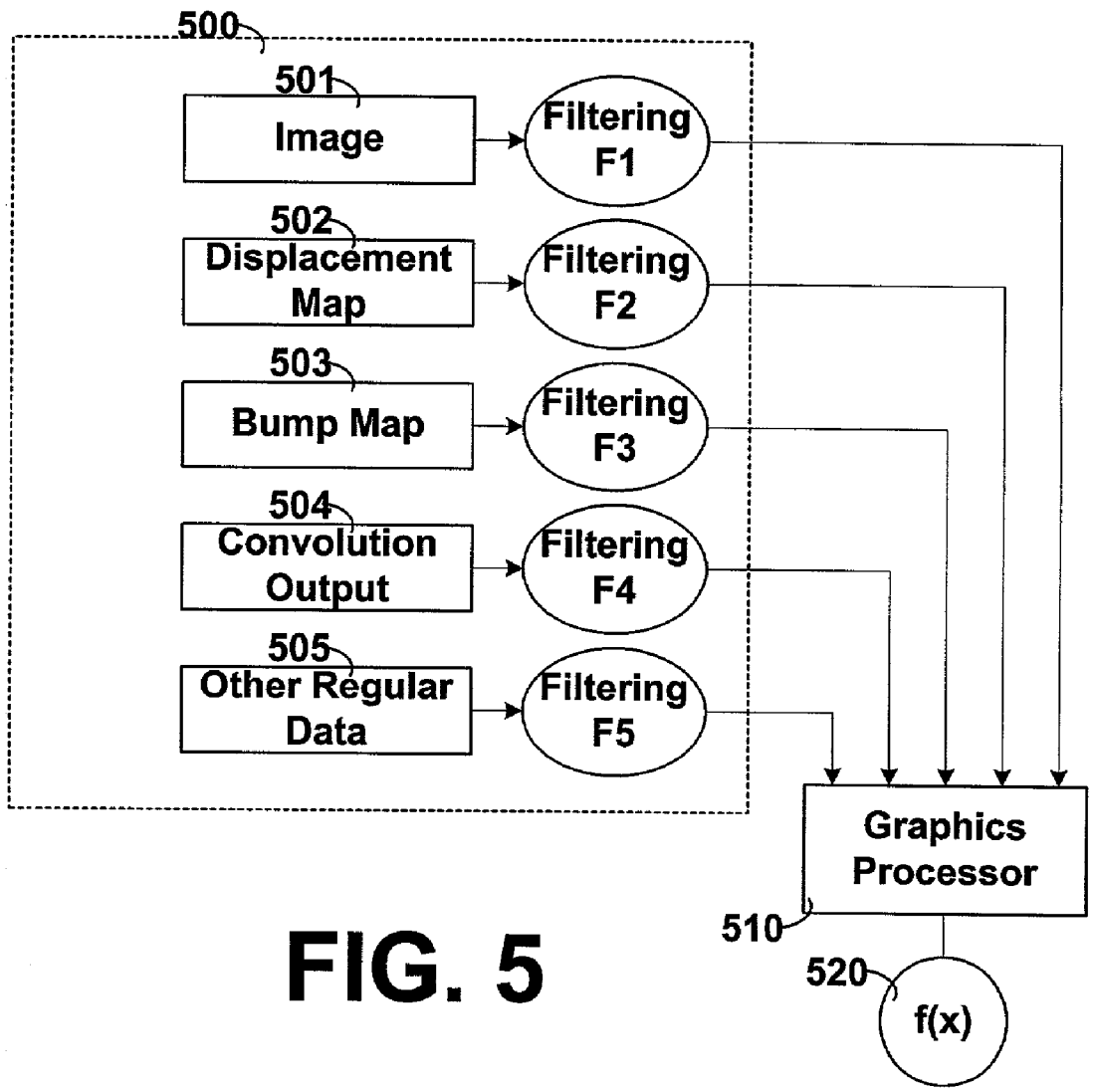
FIG. 5 illustrates non-limiting implementation of the invention in connection with a coprocessor, such as a graphics processor, in a computing system.

FIG. 5 depicts a simplified block diagram of an exemplary implementation of the present invention in an image processing system, although the invention is not so limited. The regular input data 500 may constitute image or texture map data 501, displacement map data 502, bump map data 503, convolution output data 504, and/or other regular data that may be specified in a 1-D or a 2-D array or specified in an immediate or intermediate fashion to the hardware. Depending on the nature of this regular data, host software and/or the hardware may optionally filter the data via filters F1, F2, etc. before passing the data to the rest of the graphics processor for further processing i.e., the input data may be a filtered version of the original data. The graphics processor 510 may then take the input data 500 and generate derivative data. At some point during the processing of this data, the graphics processor 310 may apply some function f(x) 520 to the data to map the derived data to a real-valued function that can then be quantized, and so on. At any point during the processing of graphics data, there may be a step wherein data is mapped to a real valued range, whereby the invention may be applied to reduce clipping error.

The application of a function f(x) 520 is optional and one of ordinary skill in the art can appreciate that the input data may be directly transmitted to quantizer. Such filters F1, F2, or such function f(x) nonetheless provides considerable flexibility when deciding upon which data to perform error diffusion. In short, there are millions of reasons one might want to clip data to a real valued range, and the present invention provides a low cost, high quality and fast solution for doing so as the data is passed through any one or more parts of a computing device 110, a graphics processor 310, or the like, whether provided as software, hardware or a combination of both.

As mentioned above, while exemplary embodiments of the present invention have been described in connection with various computing devices and network architectures, the underlying concepts may be applied to any computing device or system in which it is desirable to reconstruct signals from point samples with minimal error. Thus, the techniques for providing improved signal processing in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent error diffusion achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Still further, while the range has been described herein as a range with both a lower limit and an upper limit, the techniques could be applied to a range having a one-sided limit, i.e., where the range has a restricted lower limit with an unrestricted upper limit or the range has an unrestricted lower limit with a restricted upper limit. Therefore, the present invention should not be limited to any single embodiment, but rather should be construed in breadth and scope in accordance with the appended claims.

What is claimed is:

1. A method for minimizing error introduced by clipping values of an ordered data set to a restricted range, with the restricted range including at least one member of a group comprising a lower limit and an upper limit, wherein the data set includes at least one data sample having a value beyond the restricted range, comprising:

receiving the values of the ordered data set, wherein the ordered data set includes at least one data sample having a value beyond the restricted range, the restricted range including said at least one member of the group comprising the lower limit and the upper limit;

clipping the values of the ordered data set to the restricted range, said clipping including:

identifying said at least one data sample having a value beyond the restricted range; and for each of said at least one data sample, distributing one member of a group comprising (A) the equal amount of the value of the data sample in excess of the upper limit and (B) the equal amount of the value of the data sample below the lower limit to at least two adjacent neighbors of the data sample;

generating an output clipped data set in accordance with said clipping; and generating modified multi-media content based on the output clipped data set.

2. A method according to claim 1, further including iteratively performing said identifying and said distributing on the resulting data set at least a second time.

3. A method according to claim 1, further including after said identifying and distributing, determining which data samples have values that are beyond the restricted range and clipping any such values to the at least one limit of the restricted range.

4. A method according to claim 1, wherein said restricted range includes both an upper limit and a lower limit.

5. A method according to claim 4, further including after said identifying and distributing, squeezing the resulting data set to the restricted range.

6. A method according to claim 1, wherein the modified multi-media content is at least one member of a group comprising image data and audio data.

7. A method according to claim 1, wherein prior to said identifying, said data set is digitally filtered to reduce aliasing effects.

8. A method according to claim 7, wherein prior to said identifying, said data set is low pass filtered at a frequency that is one member of a group comprising (1) the Nyquist frequency to reduce aliasing effects and (2) a frequency below the Nyquist frequency to reduce aliasing effects.

9. A method according to claim 1, wherein the method operates on the data set one data sample at a time, and produces the same result irrespective of die order in witch the data samples are operated upon.

10. A tangible computer readable storage medium having stored thereon a plurality of computer-executable instructions for performing the method of claim 1.

11. At least one tangible computer readable storage medium having stored thereon a plurality of computer-executable modules for minimizing error introduced by clipping values of an ordered data set to a restricted range, with the restricted range including at least one member of a group comprising a lower limit and an upper limit, wherein the data set includes at least one data sample having a value beyond the restricted range, the computer executable modules, comprising:
  an input object for receiving the values of the ordered data set, wherein the ordered data set includes at least one data sample having a value beyond the restricted range, the restricted range including said at least one member of the group comprising the lower limit and the upper limit;
  a clipping object for clipping the values of the ordered data set to the restricted range and generating an output clipped data set in accordance with said clipping, said clipping object including;
  a diffusion object for identifying said at least one data sample having a value beyond the restricted range and for each of said at least one data sample, distributing one member of a group comprising (A) the equal amount of the value of the data sample in excess of the upper limit and (B) the equal amount of the value of die data sample below the lower limit to at least two adjacent neighbors of the data sample; and
  a multi-media content generation object for generating modified multi-media content based on the output clipped data set.

12. At least one tangible computer readable storage medium according to claim 11, wherein said diffusion object iteratively performs said identifying and said distributing on the resulting data set at least a second time.

13. At least one tangible computer readable storage medium according to claim 11, wherein said diffusion object, after said identifying and distributing, determines which data samples have values that are beyond the restricted range and clips any such values to the at least one limit of the restricted range.

14. At least one tangible computer readable storage medium according to claim 11, wherein said restricted range includes both an upper limit and a lower limit.

15. At least one tangible computer readable storage medium according to claim 14, wherein said diffusion object, after said identifying and distributing, squeezes the resulting data set to the restricted range.

16. At least one tangible computer readable storage medium according to claim 11, wherein the modified multi-media content is at least one member of a group comprising image data and audio data.

17. At least one tangible computer readable storage medium according to claim 11, wherein prior to said identifying by said diffusion object, said data set is digitally filtered to reduce chasing effects.

18. At least one tangible computer readable storage medium according to claim 17, wherein prior to said identifying by said diffusion object, said data set is low pass filtered at a frequency that is one member of a group comprising (1) the Nyquist frequency to reduce aliasing effects and (2) a frequency below the Nyquist frequency to reduce aliasing effects.

19. At least one tangible computer readable storage medium according to claim 11, wherein the diffusion object operates on the data set one data sample at a time, and produces the same result irrespective of the order in which the data samples are operated upon.

20. A computing device for minimizing error introduced by clipping values of an ordered data set to a restricted range, with the restricted range including at least one member of a group comprising a lower limit and an upper limit, wherein the data set includes at least one data sample having a value beyond the restricted range, the computing device comprising:
  an input object for receiving the values of the ordered data set, wherein the ordered data set includes at least one data sample having a value beyond the restricted range, the restricted range including said at least one member of the group comprising the lower limit and the upper limit;
  a clipping object for clipping the values of the ordered data set to the restricted range, said clipping object including:
  a diffusion object for identifying said at least one data sample having a value beyond the restricted range and for each of said at least one data sample, distributing one member of a group comprising (A) the equal amount of die value of the data sample in excess of the upper limit and (B) the equal amount of the value of the data sample below the lower limit to at least two adjacent neighbors of the data sample; and
  a multi-media content generation object for generating modified multi-media content based on die output clipped data set.

21. A computing device according to claim 20, wherein said diffusion object iteratively performs said identifying and said distributing on the resulting data set at least a second time.

22. A computing device according to claim 20, wherein said diffusion object, after said identifying and distributing, determines which data samples have values that are beyond the restricted range and clips any such values to the at least one limit of the restricted range.

23. A computing device according to claim 20, wherein said restricted range includes both an upper limit and a lower limit.

24. A computing device according to claim 23, wherein said diffusion object, after said identifying and distributing, squeezes the resulting data set to the restricted range.

25. A computing device according to claim 20, wherein the modified multi-media content is at least one member of a group comprising image data and audio data.

26. A computing device according to claim 20, wherein prior to said identifying by said diffusion object, said data set is digitally filtered to reduce aliasing effects.

27. A computing device according to claim 20, wherein prior to said identifying by said diffusion object, said data set is low pass filtered at a frequency that is one member of a group comprising (1) the Nyquist frequency to reduce aliasing effects and (2) a frequency below the Nyquist frequency to reduce aliasing effects.

28. A computing device according to claim 20, wherein the diffusion object operates on the data set one data sample at a time, and produces the same result irrespective of the order in which the data samples are operated upon.

* * * * *